United States Patent [19]
Dalrymple

[11] 3,782,203
[45] Jan. 1, 1974

[54] DYNAMIC BALANCING APPARATUS
[75] Inventor: Donald D. Dalrymple, North Warren, Pa.
[73] Assignee: National Forge Company, Irvine, Pa.
[22] Filed: Jan. 12, 1972
[21] Appl. No.: 217,358

[52] U.S. Cl. .................................................. 73/468
[51] Int. Cl. .......................................... G01m 1/20
[58] Field of Search...................... 73/478, 468, 462

[56] References Cited
UNITED STATES PATENTS
| | | | |
|---|---|---|---|
| 1,639,444 | 8/1927 | Terry | 73/468 |
| 2,186,339 | 1/1940 | Moore | 73/478 |
| 3,611,792 | 10/1971 | Hines | 73/478 |

Primary Examiner—James J. Gill
Attorney—Charles B. Smith

[57] ABSTRACT

A work piece is rotated by a motor through a flexible connection while being supported on rollers mounted on a frame flexibly mounted for horizontal movement. The horizontal vibration of the frame due to the unbalance of the rotated work piece opens and closes a pair of electrical contacts and thereby energizes a light rotated in synchronism with the work piece. The angular orientation at which the light is lit during its revolution indicates the angular position of the unbalance of the work piece. The amount of unbalance is determined by measuring the amount of current required by a pair of rigidly mounted solenoids which are energized to grip a projection of the frame and suppress the vibration, as indicated when the lamp ceases to flash.

11 Claims, 6 Drawing Figures

PATENTED JAN 1 1974 3,782,203

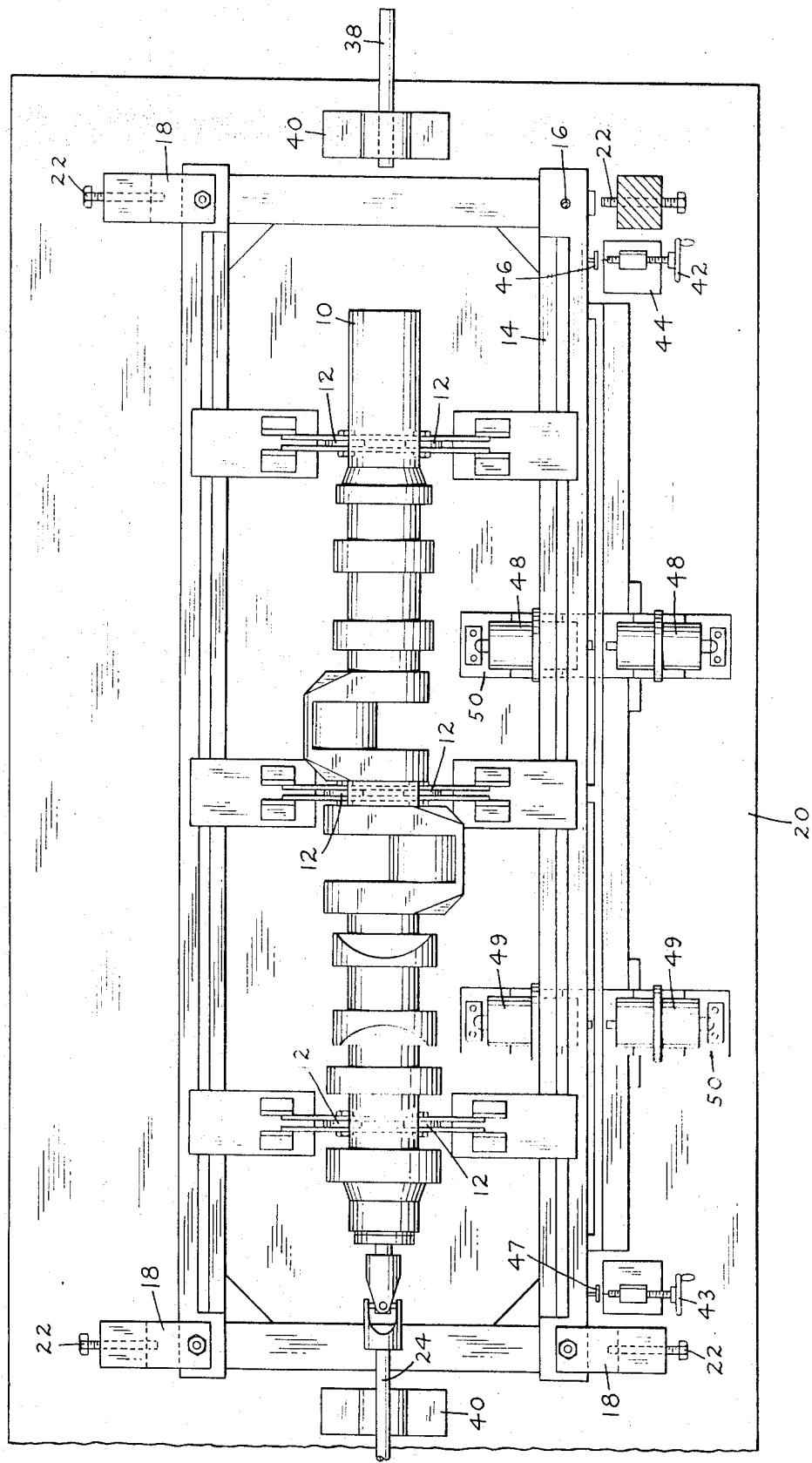

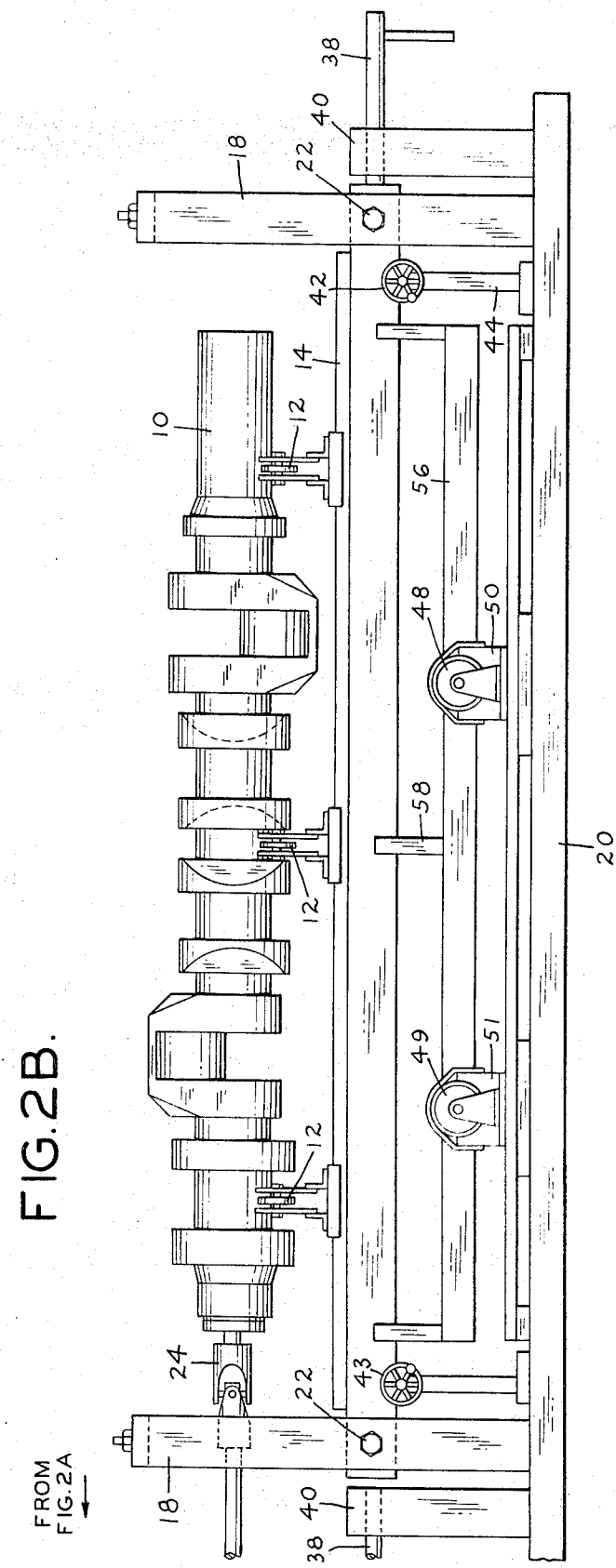

DYNAMIC BALANCING APPARATUS

BACKGROUND OF THE INVENTION

The present invention relates to apparatus for dynamically measuring the amount of unbalance of a work piece and more particularly to an apparatus for measuring the amount of unbalance by the vibration suppression technique.

Modern dynamic balancing machines generally either measure the amount of movement the unbalance in the work piece causes while the work piece is rotated on some kind of softly sprung bearings or, in the case of a hard sprung bearing machine, the work piece is rotated on rigid bearings and the slight movement of the work piece caused by the unbalance is measured. Both the soft bearing and hard bearing methods require a considerable amount of electronic equipment. The hard bearing devices, in particular, require a great deal of expensive and sophisticated equipment.

Another technique measures the amount of unbalance by measuring the force required to suppress the vibrations of the rotating unbalanced work piece. In one suggested device an electro-magnet is placed in such a manner that when it is energized it exerts a force on the frame in which the rotating work piece is mounted. Power is applied to the magnet in the form of an electrical pulse which is synchronized with the vibrations of the work piece frame due to the unbalance in the work piece. The effect of the electrical pulse applied to the electro-magnet is to exert a momentary magnetic force on the frame in which the work piece is mounted to offset the force caused by the unbalance in the work piece so that the vibrations cease.

Such a device poses considerable technical problems in its manufacture and operation. The amount of current and the frequency of the electrical pulses which must be supplied to the electro-magnet are often large. Therefore the switch which supplies the electrical pulse is not likely to have a long life unless it is constructed of very high quality materials. Furthermore since the electro-magnet is energized on a cyclic basis the inductance of the magnet's coil must be taken into account in making the force generated by the electro-magnet coincide in time with the vibration caused by the unbalance. It is the accuracy of this timing coincidence which determines the accuracy of the measure of both the angular location and the magnitude of the unbalance in the work piece. The inductance of the coil in the electromagnet tends to delay the effect of the electrical pulse as it is applied to the magnet.

Another disadvantage of some prior vibration suppression devices is that vibration suppression takes place in a vertical plane, that is the vibration suppressing force is applied in a vertical plane. This requires that gravitational effects must be accounted for in determining the magnitude of the unbalance.

Still another disadvantage of some prior dynamic balancing machines is that it is necessary to first balance one end of the work piece, remove the work piece from the test apparatus, turn the work piece end for end and replace it in the test apparatus to balance to its opposite end. This operation is time consuming and expensive.

The present invention overcomes these and other disadvantages by a novel design which simplifies the manufacture of the testing apparatus as well as the technique used for implementing the testing apparatus.

SUMMARY OF THE INVENTION

A preferred embodiment of the present invention comprises an inner frame supported at its corners by flexible cables from an outer frame, the inner frame having rollers for supporting the work piece to be balanced. The work piece is rotated about a horizontal axis by a drive motor through a flexible coupling. One end of the inner frame is locked to the outer frame along an axis traverse to the axis of rotation of the work piece. The unbalance in the work piece causes it to vibrate the unlocked end of the inner frame in a horizontal plane.

An electrical contact between the outer frame and the unlocked end of the inner frame is adjusted until it makes an electrical connection between the two frames in synchronism with the vibrations during each revolution of the work piece. The connection activates a neon light which is rotated in synchronism with the rotation of the work piece so that the angular orientation at which the light is lit during each revolution indicates the angle at which the unbalance of the work piece is located.

A pair of opposed electrical solenoids are mounted on the outer frame between the middle of the work piece and the unlocked end of the inner frame which grip a projection of the inner frame between their respective armatures when they are energized. The amount of unbalance is determined by measuring the amount of current required by the solenoids to grip the inner frame tightly enough between their armatures to suppress the vibrations caused by the unbalance in the work piece. The cessation of the vibrations is indicated when the rotating lamp no longer flashes.

A weight of sufficient magnitude as indicated by the measure of current may be added to the work piece at a predetermined radius, at the angle indicated by the rotating light, and in a plane which is parallel to the point at which the solenoids gripped the inner frame to correct the unbalance. The opposite end of the work piece is balanced in a similar manner by unlocking the first end of the inner frame and locking the opposite end and by either moving the solenoids to the opposite end of the outer frame in one embodiment or by energizing a second pair of solenoids placed toward the opposite end of the outer frame in another embodiment.

The apparatus is initially calibrated by using known weights at predetermined radii which are then rotated and the vibration caused by their "unbalance" is suppressed in the manner described above. The ammeter which measures the current supplied to the solenoids is then calibrated to be read directly in ounce-inches of force.

The armatures of the solenoids are supported on vertical springs to eliminate friction in connection with their movement. Since the measure of the unbalance is by direct measure of the current through the solenoids, any changes in the resistance of the rheostat or of the solenoid windings due to changes in the ambient temperature do not effect the measure of the unbalance. In some prior balancing devices the position of a rheostat control is an indication of the amount of the unbalance and this position must necessarily vary somewhat with changes in the ambient temperature, thereby leading to inaccurate readings.

Another advantage of the present invention is that the work piece may be balanced at both ends without the necessity of removing it from the test apparatus. Thus the present invention is far more convenient to use than many prior devices which require that the work piece be removed and literally turned around in the testing apparatus. Furthermore the electronic circuitry of the present invention is relatively straight forward, uncomplicated and inexpensive compared to circuitry of many prior such devices. A still further advantage of the present invention is that because of its relative simplicity the operator does not require any specialized training.

Still another advantage of the present invention is that because vibration suppression takes place effectively in a horizontal plane no compensation is necessary for the effects of gravity on the unbalance.

It is therefore an object of the present invention to provide an apparatus which is simple in construction and operation for dynamically balancing a work piece.

It is another object of the invention to provide a dynamic balancing apparatus which is reliable and has a relatively long life.

It is still another object of the invention to provide a dynamic balancing apparatus which does not require that the work piece be removed from the testing apparatus and repositioned in order that both ends of the work piece may be balanced.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 1A and 1B taken together constitute a plan view of the preferred embodiment of the invention;

FIGS. 2A and 2B together constitute a side view of the preferred embodiment of the invention;

DESCRIPTION OF THE PREFERRED EMBODIMENT

Figure 1A:
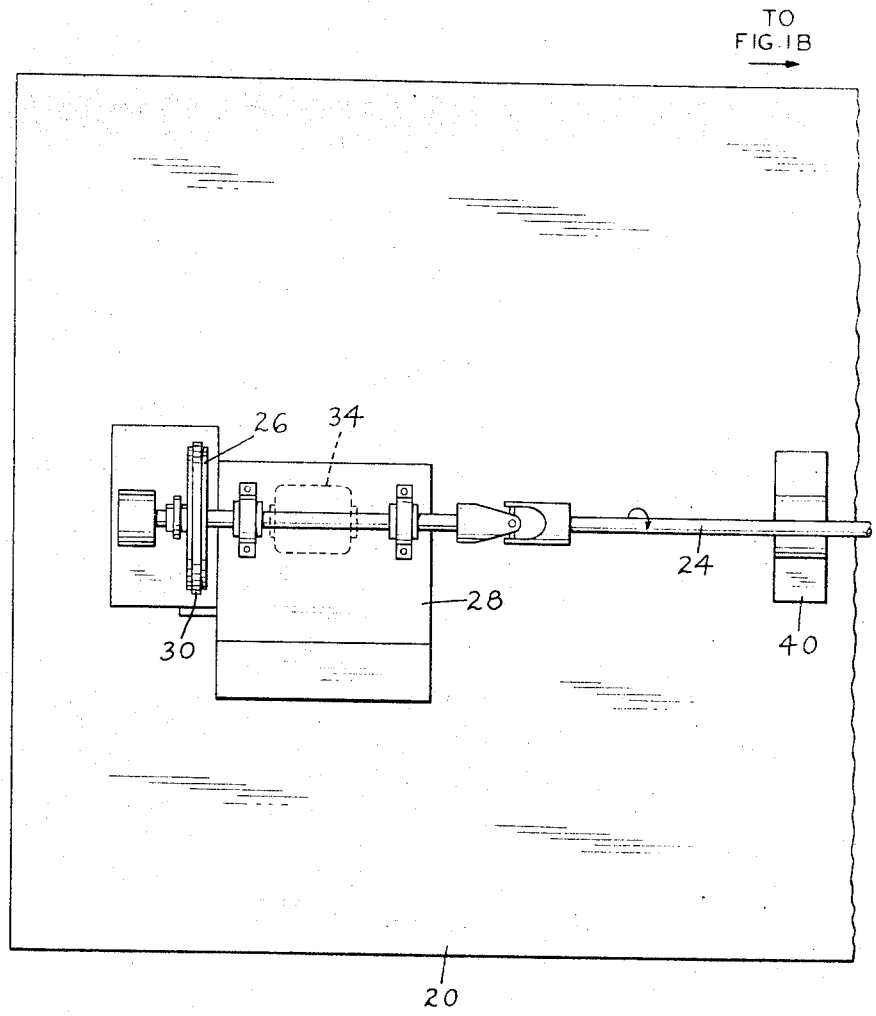
Figure 2A:
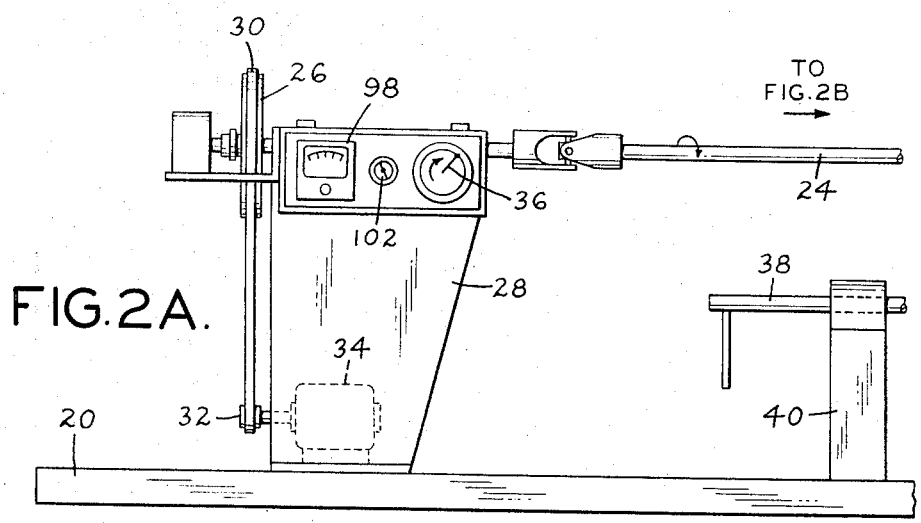
Figure 3:
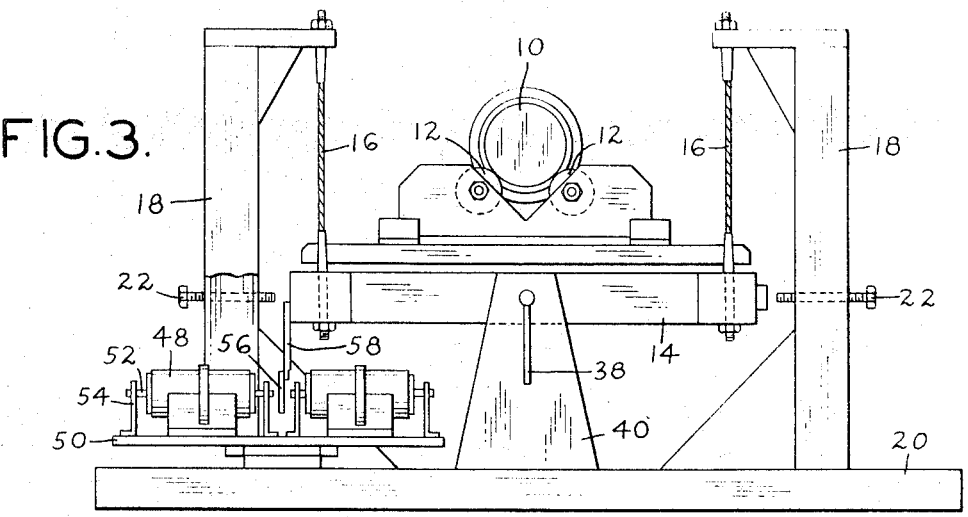
FIG. 3 is an end view of the preferred embodiment of the invention.

Referring now more particularly to FIGS. 1A, 1B, 2A, 2B, and 3 there is shown a work piece 10 supported horizontally on a plurality of rollers 12 which are mounted on an inner frame 14. The inner frame 14 is suspended by flexible cables 16 at each of its four corners from an outer frame 18. The frame 18 is rigidly mounted on the floor 20. Adjustable bolts 22 are threaded in the outer frame 18 which may be turned inwardly to contact each of the four corners of the inner frame 14 and hold it rigid with respect to the outer frame when the work piece is initially mounted for testing. During testing the bolts 22 are withdrawn as illustrated in the Figures to allow the inner frame to be movable in a horizontal plane with respect to the outer frame 18.

The work piece 10 is connected by a flexible coupling 24 to a pulley 26 mounted in an upright test console 28 fastened to the floor 20. The pulley 26 is driven by a belt 30 which is connected to a pulley 32 on the end of the drive shaft of a motor 34 mounted within the console 28. Thus the work piece is rotated about its longitudinal axis by the motor 34 through the pulley 32, the belt 30, the pulley 26 and the coupling 24. A light 36 is mounted in the console 28 and is connected through a gear system, not shown, to the coupling 24 so that it rotates in synchronism with the shaft 24 and the work piece 10. The light 36 is preferably a neon light because of its capability of lighting in microseconds and because it draws little current compared to filament type lights. Each end of the inner frame 14 can be transversely locked with respect to the outer frame 18, i.e. can be locked along an axis perpendicular to the axis of rotation of the work piece (the longitudinal axis) by a long movable pin fixture 38 mounted in an upstanding support 40. During testing one end of the inner frame is transversely locked so that the inner frame becomes, in effect, a cantilever beam and thus the other end of the work piece may be balanced independently of whatever unbalance exists at the locked end of the work piece. For purposes of illustration in the following description the pin 38 closest to the console 28 is considered as being slid into the locking position. Thus the end of the inner frame 14 closest to the console 28 is transversely locked by the pin 38 and cannot move in a transversely horizontal plane with respect to the outer frame. As such, when an unbalanced work piece is rotated on the inner frame, the inner frame 14 will act as a cantilever beam and the dynamic forces resulting from the rotation of the unbalanced work piece will be manifested by a transverse, horizontal, vibratory movement of the inner frame 14.

At opposite ends of the frame 14 are spring loaded electrodes 42 and 43 which are adjustably mounted in upstanding supports 44. Separate electrodes 46 and 47 are mounted opposite the electrodes 42 and 43, respectively, on the inner frame 14. The unbalance in the rotating work piece causes the unlocked end of the inner frame 14 to move in a horizontal, vibratory arc. The electrode 42, which is located at the end of the outer frame 18 furthest from the console 28, is turned to move the electrode toward the inner frame 14 until it makes contact with its corresponding electrode 46 once during each revolution of the work piece and thus once during each cycle of the vibratory movement of the unrestrained end of the inner frame at a time coincident with one peak of its arc-movement.

As will be explained in greater detail below, when the opposed electrodes contact each other, such as when the electrode 42 contacts the electrode 46, an electrical circuit is completed and the rotating light 36 on the console 28 is lit. Since the light rotates in synchronism with the rotation of the work piece the point at which the light remains lit during each cycle is representative of the rotational angle at which the heavy area or unbalance of the work piece is located.

After the angular orientation of the unbalance is determined as described above a pair of solenoids 48 mounted on a frame 50, which is slidable along the base 20, are moved to the area where it is desired to correct the work piece. The frame 50 is then locked into this position. The position selected will be an accessible position whereat material may be either added to, or removed from, the work piece and may be located between the unlocked and and the midpoint of the work piece.

The armatures 52 of the solenoid 48 are mounted in vertical leaf springs 54 to make horizontal movement of the armatures as friction free as possible. The solenoids 48 are mounted opposite each other on the frame 50 so that when energized by a current of proper polarity their armatures extend toward each other. when unenergized, the springs 54 return the armatures to their neutral positions so that they are separated from each other.

A second pair of solenoids 49 are similarly constructed and slidably mounted at the opposite end of frame 18 and are used to balance the end of the work piece closest to the console 28. In some embodiments only one set of solenoids are used. The single set is merely slid from one end of the outer frame to the other in order to balance both ends of the work piece.

A rigid bar 56 extending along the length of the base 20 and supported from the inner frame 14 by downwardly extending rigid legs 58 is positioned between the armatures 52 of each pair of solenoids 48 and 49. When sufficiently energized by an electric current the solenoid armatures 52 will grip the bar 56 tightly enough to prevent any horizontal vibrations of the inner framework 14.

Figure 4:
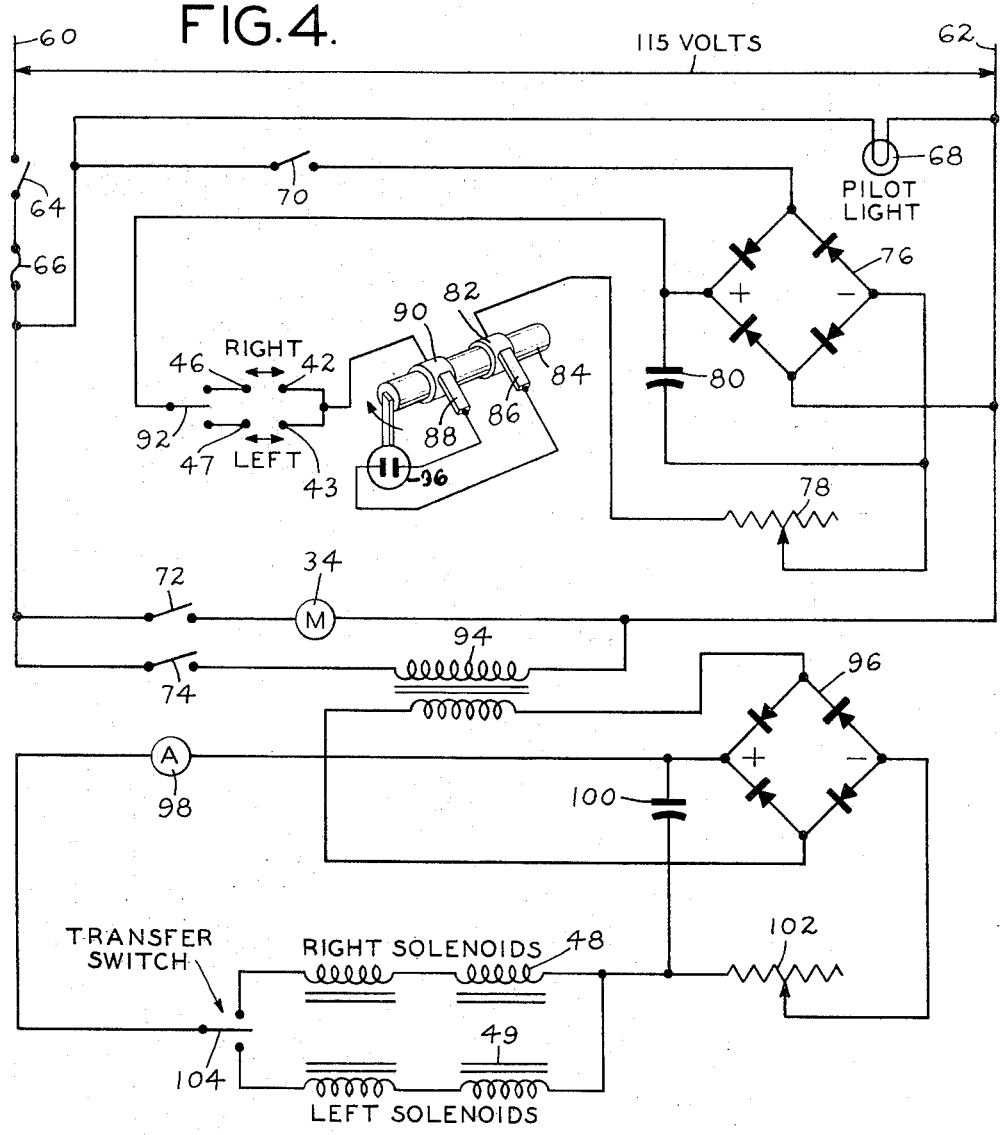
FIG. 4 is a schematic diagram of the electrical circuitry of the preferred embodiment of the invention.

Referring now more particularly to FIG. 4 the electrical circuit of the apparatus is schematically illustrated. Electrical power in the form of 115 volts A.C. from an external source (not shown) is applied to the input leads 60 and 62 of the apparatus. Lead 60 is connected to the pole terminal of a master on/off switch 64. The contact arm of the switch 64 is connected through a fuse 66 to one lead of a pilot light 68 and to each of the contact arms of on/off switches 70, 72, and 74. The opposite lead of the pilot light 68 is connected to the power lead 62.

The pole terminal of the switch 70 is connected to one side of a full wave rectifier bridge 76. The opposite side of the rectifier bridge 76 is connected to the power lead 62. The negative terminal of the rectifier bridge 76 is connected to the contact arm of a rheostat 78 and to one lead of a capacitor 80. The other lead of the capacitor 80 is connected to the positive terminal of the rectifier bridge 76.

The remaining lead of the rheostat 78 is connected to a slip ring 82 mounted about a shaft 84 which carries the light 36. The shaft 84 is rotated in synchronism with the work piece 10 by a gear train, not shown. One lead of the light 36 is connected to a brush 86 which rides in contact with the slip ring 82 so as to establish an electrical circuit therebetween. The other lead of the light 36 is connected to a brush 88 which rides in electrical contact with a slip ring 90 also mounted about the shaft 84. The slip ring 90 is connected to the adjustable electrodes 42 and 43 at each end of the outer frame 18. The positive lead of the rectifier bridge 76 is also connected to the contact arm of a single pole, double throw switch 92. One pole of the switch 92 is connected to the electrode 46 and the other pole of the switch 92 is connected to the electrode 47.

As described above when a given end of the work piece is tested the appropriate one of the electrodes 42 or 43 is selected by means of switch 92. The electrode is adjusted to be just barely in contact with its corresponding electrode 46 or 47, respectively, so that the movement of the inner frame 14 due to unbalance of the work piece causes the two opposed electrodes to make an electric circuit as the heavy area of the work piece passes through the horizontal position. The contacting of the electrodes energizes the light 36 by supplying power from the rectifier bridge 76 and the capacitor 80. The brightness of the light is controlled by the rheostat 78.

The pole of switch 72 is connected to one lead of the motor 34. The opposite lead of the motor 34 is connected to the power lead 62. Thus the switch 72 is an on/off switch for the motor 34. The pole of switch 74 is connected to one lead of the primary coil of a transformer 94. The opposite lead of the primary coil of the transformer 94 is connected to the power lead 62. The leads of the secondary coil of transformer 94 are connected to supply a full wave rectifier bridge 96.

The positive terminal of the rectifier bridge 96 is connected to one lead of an ammeter 98 and one lead of a capacitor 100. The ammeter 98 is mounted on the console 28 and is calibrated in terms of ounce-inches of force as will be explained in greater detail below. The negative terminal of the rectifier bridge 96 is connected to the sliding contact arm of a rheostat 102. The other end of the rheostat 102 is connected to the remaining lead of the capacitor 100 and to one lead of each of the solenoids 48 and 49. The rheostat 102 is mounted on the console 28 so as to be adjustable by the operator.

The other leads of the solenoids 48 and 49 are connected to the separate poles of a single pole, double throw switch 104. The contact arm of the switch 104 is connected to the remaining lead of the ammeter 98. The switch 104 allows the operator of the device to choose which set of solenoids 48 or 49 are to be energized.

The power for the vibration suppressing solenoids 48 or 49 is supplied by the rectifier bridge 96 and the capacitor 100. The rheostat 102 allows the amount of current supplied to the solenoids to be varied by the operator. As explained above when the pair of solenoids are sufficiently energized they grip the bar 56 tightly enough to suppress the vibratory motion of the inner frame 14. In operation the current to the pair of solenoids is gradually increased by adjusting the rheostat 102 until the vibration of the inner frame 14 ceases and the light 36 is no longer lit. When this occurs the operator notes the reading on the meter 98 which will indicate directly the amount of unbalance in terms of ounce-inches of force. The operator may then correct the unbalance by adding an appropriate weight at a predetemined distance from the center of the axis of rotation of the work piece. The meter 98 is initially calibrated in ounce-inches of force by rotating predetermined weights at known radii in the test assembly.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for dynamically measuring the unbalance of a work piece comprising horizontally movable support means for rotatably mounting a work piece, means for restraining the horizontal, transverse movement of one end of said support means, means for rotating the work piece in the support means about a horizontal axis so as to cause a vibratory, horizontal movement of the work piece due to its unbalance, electric means responsive to the vibratory movement of the work piece for indicating the angular location of the unbalance of the work piece about its axis of rotation and indicating whether or not the work piece is vibrating, a variable source of electric current, electromagnetic means responsive to the electric current for gripping and exerting a continuous force upon said support means to suppress the vibratory, horizontal motion of the work piece as the current is increased, and means for measuring the electric current to give an indication of the unbalance of the work piece.

2. Apparatus for dynamically measuring the unbalance of a work piece as recited in claim 1 comprising an outer frame, an inner frame, means for flexibly supporting the inner frame from the outer frame to allow at least one end of the inner frame to vibrate horizontally with respect to the outer frame, and wherein the means for rotatably supporting the work piece is mounted on the inner frame.

3. Apparatus for dynamically measuring the unbalance of a work piece as recited in claim 2 wherein the electric means for indicating the angular location of the unbalance comprises a first electrode mounted on the outer frame, a second electrode mounted opposite the first electrode on the inner frame, at least one of the first and second electrodes being adjustable toward the other such that the first and second electrodes only contact each other momentarily due to the vibration of the inner frame, a source of electric power, a light, means for connecting the light in series with the first and second electrodes to the source of electric power, means for rotating the light in synchronism with the rotation of the work piece such that the angular position of the light when energized by the source of electric power through the closing of the first and second electrodes is an indication of the angular position of the unbalance of the work piece.

4. Apparatus for dynamically measuring the unbalance of a work piece as recited in claim 2 wherein the electro-magnetic means comprises a pair of solenoids, each solenoid having an armature which is movable into and out of the solenoid, means for mounting the solenoids so that when energized by an electric current of a predetermined polarity from the variable source the armature of each solenoid is caused to move toward the armature of the other solenoid, and a substantially rigid extension of the inner frame positioned so as to be gripped between the armatures when the solenoids are so energized.

5. Apparatus for dynamically measuring the unbalance of a work piece comprising an outer frame, an inner frame, means for flexibly supporting the inner frame to allow the inner frame to move substantially only horizontally with respect to the outer frame, means mounted on the inner frame for rotatably supporting the work piece, means for rotating the work piece in the rotatable support means about a horizontal axis so as to cause horizontal, vibratory movement of the inner frame due to the unbalance in the work piece, means for pivotally restraining the horizontal transverse movement of one end of the inner frame so that the unrestrained end of the inner frame may vibrate in a horizontal arc about its restrained end, means responsive to the vibratory movement of the unrestrained end of the inner frame for indicating whether or not the work piece is vibratory and the angular location of the unbalance about the horizontal axis of the work piece, the angular location indicating means including a light, means for rotating the light in synchronism with the work piece, and means for momentarily energizing the light once during each cycle of vibratory movement of the unrestrained end of the inner frame at a time coincident with the greatest extend of its movement, a variable source of electric current, electro-magnetic means responsive to the electric current, electro-magnetic means responsive to the electric current for gripping the inner frame with respect to the outer frame and continuously exerting a force upon the inner frame to suppress the vibratory motion of the inner frame in proportion to the amount of electric current supplied, and means for measuring the amount of electric current supplied to suppress substantially all such vibratory motion to give an indication of the unbalance of the work piece.

6. Apparatus for dynamically measuring the rotational unbalance of a work piece comprising:
   a. a horizontally disposed frame;
   b. means for rotatably mounting a work piece on said frame;
   c. means for restraining one end of said frame against transverse, horizontal movement;
   d. means for rotating a work piece disposed on said rotatable mounting means;
   e. detecting means for producing a first signal representative of the vibratory, transverse horizontal movement of said frame when an unbalanced work piece is rotated thereon;
   f. indicating means synchronized with said rotating means and responsive to said first signal for indicating the angular location of an unbalance of said work piece and for indicating whether or not the work piece is vibration;
   g. means for continuously exerting a horizontal transverse force on said frame which suppresses said vibratory, horizontal movement; and
   h. means for measuring said suppressing force.

7. A process for determining the location and magnitude of the rotational unbalance of a work piece which comprises:
   a. rotatably mounting a work piece on a frame;
   b. restraining one end of said frame against transverse, horizontal movement;
   c. rotating said work piece about its longitudinal axis;
   d. detecting the presence and angular location of an unbalance of said shaft;
   e. exerting upon said frame a horizontal, transverse, continuous force sufficient to suppress horizontal, transverse vibratory movement caused by the unbalance of the rotating shaft; and
   f. measuring said force.

8. The apparatus of claim 6 which further comprises:
   a. an outer frame; and
   b. means for mounting said horizontally disposed frame with respect to said outer frame so that said horizontally disposed frame is movable in a horizontal plane.

9. The apparatus of claim 8 wherein said mounting means comprises means for suspending said horizontally disposed frame from said outer frame.

10. The apparatus of claim 9 wherein said force exerting means comprises at least two opposedly acting solenoids.

11. The apparatus of claim 10 wherein said two solenoids are movably mounted on said outer frame.

* * * * *